United States Patent
Furuuchi et al.

(10) Patent No.: US 12,555,812 B2
(45) Date of Patent: Feb. 17, 2026

(54) COMPOSITE MEMBER, CELL STACK DEVICE, MODULE, AND MODULE HOUSING DEVICE

(71) Applicant: KYOCERA Corporation, Kyoto (JP)

(72) Inventors: Fumito Furuuchi, Kirishima (JP); Kazuya Imanaka, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 748 days.

(21) Appl. No.: 17/802,522

(22) PCT Filed: Feb. 25, 2021

(86) PCT No.: PCT/JP2021/007219
§ 371 (c)(1),
(2) Date: Aug. 25, 2022

(87) PCT Pub. No.: WO2021/172480
PCT Pub. Date: Sep. 2, 2021

(65) Prior Publication Data
US 2023/0123142 A1    Apr. 20, 2023

(30) Foreign Application Priority Data
Feb. 28, 2020 (JP) ................................. 2020-034266

(51) Int. Cl.
*H01M 8/1226* (2016.01)
*H01M 8/2425* (2016.01)
*H01M 8/12* (2016.01)

(52) U.S. Cl.
CPC ....... *H01M 8/1226* (2013.01); *H01M 8/2425* (2013.01); *H01M 2008/1293* (2013.01)

(58) Field of Classification Search
CPC ............. H01M 8/1226; H01M 8/2425; H01M 2008/1293; H01M 8/0282; H01M 8/0228; Y02E 60/50
See application file for complete search history.

(56) References Cited

U.S. PATENT DOCUMENTS

2015/0155571 A1 * 6/2015 Higashi ............... H01M 8/2428
429/468

FOREIGN PATENT DOCUMENTS

| CN | 108179405 A | 6/2018 |
|---|---|---|
| DE | 102008032498 A1 | 1/2010 |
| JP | 2015-162357 A | 9/2015 |
| JP | 2018055912 A | 4/2018 |
| JP | 2019-215980 A | 12/2019 |

* cited by examiner

*Primary Examiner* — Muhammad S Siddiquee
(74) *Attorney, Agent, or Firm* — Procopio, Cory, Hargreaves & Savitch LLP

(57) ABSTRACT

A composite member includes a base member and a covering layer. The base member includes a first surface not exposed to an oxidizing atmosphere and contains chromium. The covering layer covers the first surface and includes a first outer surface that is not exposed to the oxidizing atmosphere. At least one of the base member and the covering layer includes an exposed surface that is exposed to the oxidizing atmosphere. The surface roughness of the exposed surface is different from the surface roughness of the first surface or the first outer surface.

15 Claims, 16 Drawing Sheets

COMPOSITE MEMBER, CELL STACK DEVICE, MODULE, AND MODULE HOUSING DEVICE

CROSS-REFERENCE TO RELATED APPLICATIONS

This application is a national stage application of International Application No. PCT/JP2021/007219, filed on Feb. 25, 2021, which designates the United States, incorporated herein by reference, and which claims the benefit of priority from Japanese Patent Application No. 2020-034266, filed on Feb. 28, 2020, the entire contents of which are incorporated herein by reference.

TECHNICAL FIELD

The present disclosure relates to a composite member, a cell stack device, a module, and a module housing device.

BACKGROUND ART

In recent years, various fuel cell stack devices each including a plurality of fuel cells have been proposed as next-generation energy sources. The fuel cell is a type of cell capable of generating electrical power using a fuel gas such as a hydrogen-containing gas and an oxygen-containing gas such as air.

CITATION LIST

Patent Literature

Patent Document 1: JP 2015-162357 A

SUMMARY OF INVENTION

A composite member according to an aspect of an embodiment includes a base member and a covering layer. The base member includes a first surface not exposed to an oxidizing atmosphere, and contains chromium. The covering layer includes a first outer surface covering the first surface and not exposed to the oxidizing atmosphere. At least one of the base member and the covering layer includes an exposed surface exposed to the oxidizing atmosphere. The surface roughness of the exposed surface is different from the surface roughness of the first surface or the first outer surface.

Further, a cell stack device of the present disclosure includes a plurality of cells, the composite member described above, and a bonding material. The plurality of cells include an element portion and include a first cell. The bonding material is positioned between the element portion and the first outer surface of the covering layer. The base member includes the first surface facing the first cell, and a second surface including the exposed surface and not facing the first cell. The second surface has a surface roughness smaller than that of the first surface.

Further, a module of the present disclosure includes the cell stack device described above, and a housing container that houses the cell stack device.

Further, a module housing device of the present disclosure includes the module described above, an auxiliary device for operating the module, and an external case that houses the module and the auxiliary device.

DESCRIPTION OF EMBODIMENTS

Hereinafter, an embodiment of a composite member, a cell stack device, a module, and a module housing device disclosed in the present application will be described in detail with reference to the accompanying drawings. The disclosure is not limited by the following embodiment.

Note, further, that the drawings are schematic and that the dimensional relationships between elements, the proportions thereof, and the like may differ from the actual ones. There may be differences between the drawings in the dimensional relationships, proportions, and the like.

Configuration of Cell

First, an example of a solid oxide fuel cell will be described as a cell constituting a cell stack device according to an embodiment with reference to FIGS. 1A to 1C.

Figure 1A:
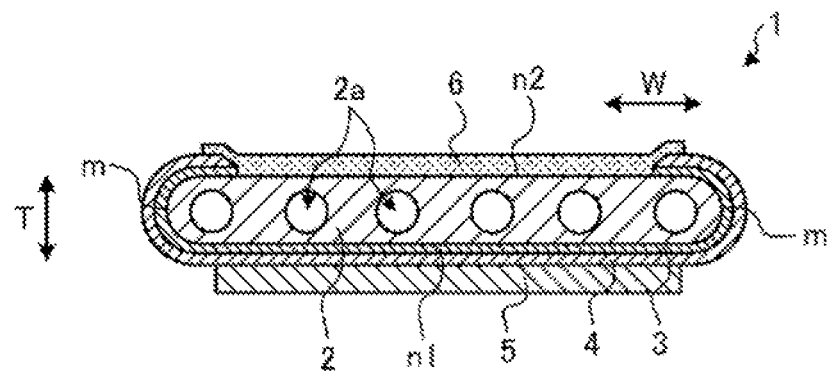
FIG. 1A is a horizontal cross-sectional view illustrating an example of a cell according to an embodiment.

FIG. 1A is a horizontal cross-sectional view illustrating an example of a cell 1 according to the embodiment. FIG. 1B is a side view illustrating the example of the cell 1 according to the embodiment when viewed from an air electrode 5 side. FIG. 1C is a side view illustrating the example of the cell 1 according to the embodiment when viewed from an interconnector 6 side. Note that FIGS. 1A to 1C each illustrate an enlarged part of a configuration of the cell 1.

Figure 1B:
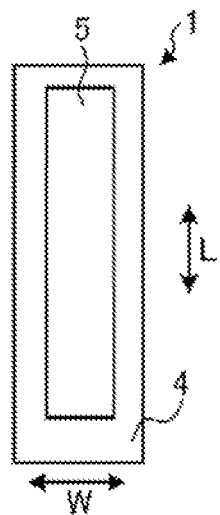
FIG. 1B is a side view illustrating the example of the cell according to the embodiment when viewed from an air electrode side.
Figure 1C:
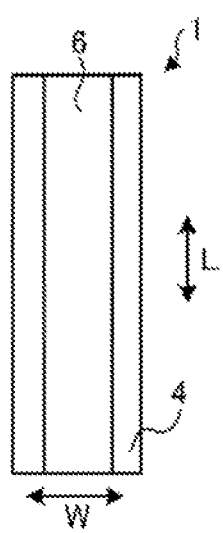
FIG. 1C is a side view illustrating the example of the cell according to the embodiment when viewed from an interconnector side.

In the example illustrated in FIGS. 1A to 1C, the cell 1 is hollow and flat plate-shaped, and has an elongated plate shape. As illustrated in FIG. 1B, the overall shape of the cell 1 when viewed from the side is, for example, a rectangle having a side length of from 5 cm to 50 cm in a length direction L and a length of from 1 cm to 10 cm in a width direction W orthogonal to the length direction L. The total thickness in a thickness direction T of this cell 1 is from 1 mm to 5 mm.

As illustrated in FIG. 1A, the cell 1 includes a support substrate 2 that is conductive, an element portion, and an interconnector 6. The support substrate 2 has a columnar shape having a pair of flat surfaces n1 and n2 on opposite sides from each other, and a pair of arc-shaped side surfaces m connecting the flat surfaces n1 and n2.

The element portion is provided on the flat surface n1 of the support substrate 2. The element portion includes a fuel electrode 3, a solid electrolyte layer 4, and an air electrode 5. Further, in the example illustrated in FIG. 1A, the interconnector 6 is provided on the second flat surface n2.

Further, as illustrated in FIG. 1B, the air electrode 5 does not extend to the lower end of the cell 1. At a lower end portion of the cell 1, only the solid electrolyte layer 4 is exposed to the surface. Further, as illustrated in FIG. 1C, the interconnector 6 may extend to the lower end of the cell 1. At the lower end portion of the cell 1, the interconnector 6 and the solid electrolyte layer 4 are exposed to the surface. Note that, as illustrated in FIG. 1A, the solid electrolyte layer 4 is exposed to the surfaces of the pair of arc-shaped side surfaces m of the cell 1.

Hereinafter, each of constituent members constituting the cell 1 will be described.

The support substrate 2 is internally provided with gas-flow passages 2a through which a gas flows. An example of the support substrate 2 illustrated in FIG. 1A includes six of the gas-flow passages 2a. The support substrate 2 has gas permeability and allows a fuel gas flowing through the gas-flow passages 2a to permeate to the fuel electrode 3. The support substrate 2 may have conductivity. The support substrate 2 having conductivity causes electricity generated in the element portion to be collected in the interconnector 6.

The material of the support substrate 2 contains, for example, an iron group metal component and an inorganic oxide. For example, the iron group metal component may be Ni (nickel) and/or NiO. For example, the inorganic oxide may be a specific rare earth element oxide.

As the material of the fuel electrode 3, a commonly known material may be used. As the material of the fuel electrode 3, a porous conductive ceramic, for example, or a ceramic containing $ZrO_2$ in which calcium oxide, magnesium oxide, or a rare earth element oxide is contained as a solid solution, and Ni and/or NiO may be used. As the rare earth element oxide, for example, $Y_2O_3$ or the like is used. Hereinafter, $ZrO_2$ in which calcium oxide, magnesium oxide, or a rare earth element oxide is contained as a solid solution may be referred to as stabilized zirconia. The stabilized zirconia also includes partially stabilized zirconia.

The solid electrolyte layer 4 is an electrolyte and bridges ions between the fuel electrode 3 and the air electrode 5. At the same time, the solid electrolyte layer 4 has gas blocking properties, and makes leakage of the fuel gas and the oxygen-containing gas less likely to occur.

The material of the solid electrolyte layer 4 may be, for example, $ZrO_2$ in which 3 mol % to 15 mol % of a rare earth element oxide is contained as a solid solution. As the rare earth element oxide, for example, $Y_2O_3$ or the like is used. Note that another material may be used as the material of the solid electrolyte layer 4, as long as the material has the aforementioned characteristics.

The material of the air electrode 5 is not particularly limited, as long as the material is commonly used for an air electrode. The material of the air electrode 5 may be, for example, a conductive ceramic such as an $ABO_3$ type perovskite oxide.

The material of the air electrode 5 may be, for example, a composite oxide in which Sr and La coexist in an A site. Examples of such a composite oxide include $La_xSr_{1-x}CoO_yFe_{1-y}O_3$, $La_xSr_{1-x}MnO_3$, $La_xSr_{1-x}FeO_3$, and $La_xSr_{1-x}CoO_3$. Here, x is $0<x<1$, and y is $0<y<1$.

Further, the air electrode 5 has gas permeability. The open porosity of the air electrode 5 may be, for example, 20% or more, and particularly may be in a range from 30% to 50%.

As the material of the interconnector 6, a lanthanum chromite-based perovskite oxide ($LaCrO_3$-based oxide), a lanthanum strontium titanium-based perovskite oxide ($LaSrTiO_3$-based oxide), or the like may be used. These materials have conductivity, and are neither reduced nor oxidized even when in contact with a fuel gas such as a hydrogen-containing gas and an oxygen-containing gas such as air.

Further, the interconnector 6 is dense, and makes the leakage of the fuel gas flowing through the gas-flow passages 2a positioned inside the support substrate 2, and of the oxygen-containing gas flowing outside the support substrate 2 less likely to occur. The interconnector 6 preferably has a relative density of 93% or more, and particularly 95% or more.

Configuration of Cell Stack Device

Figure 2A:
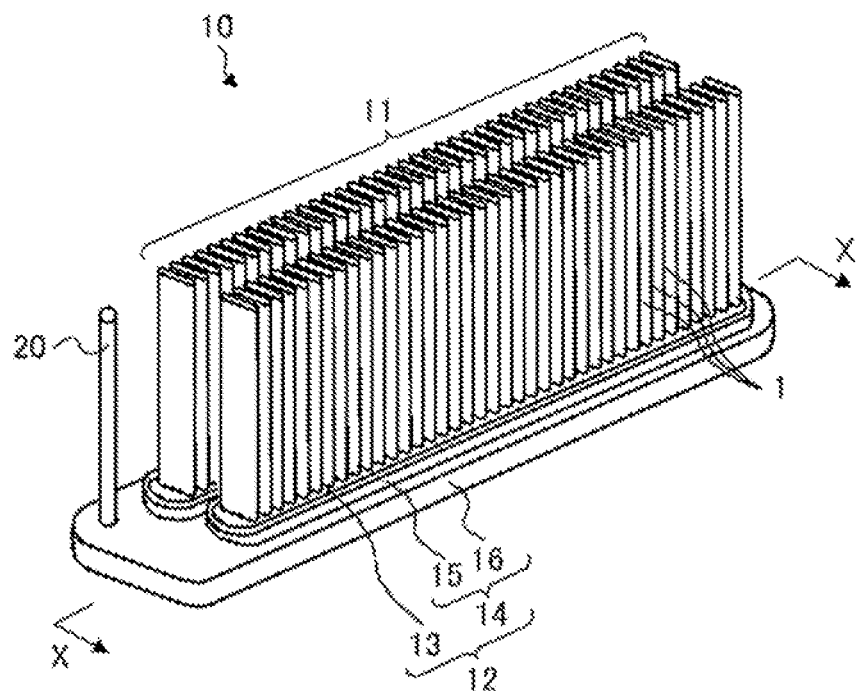
FIG. 2A is a perspective view illustrating an example of a cell stack device according to the embodiment.
Figure 2B:
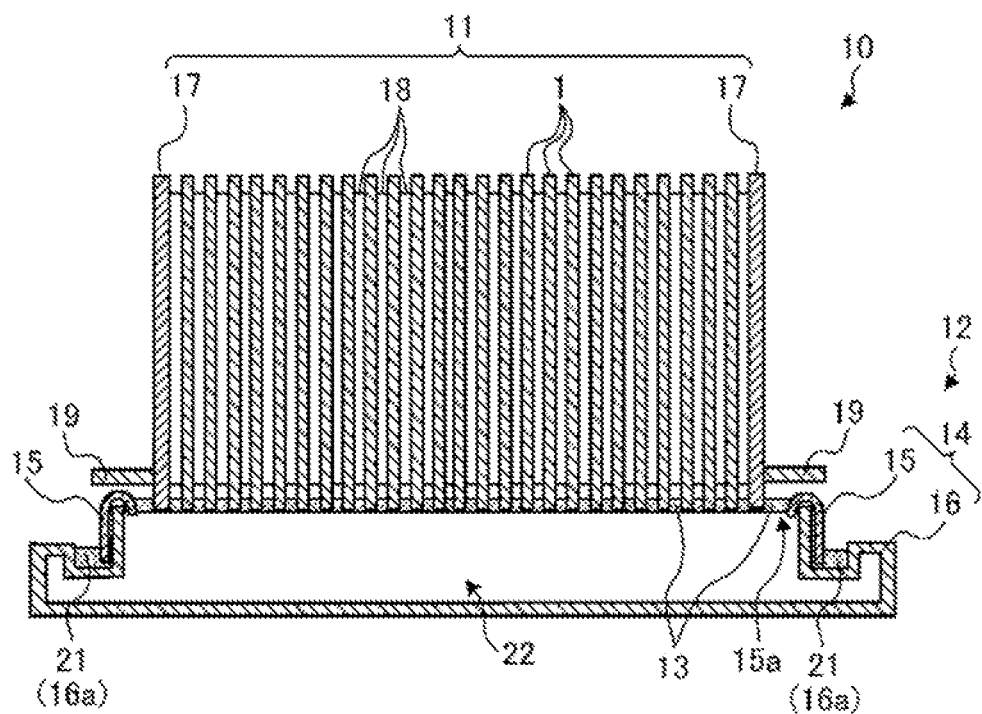
FIG. 2B is a cross-sectional view taken along a line X-X illustrated in FIG. 2A.
Figure 2C:
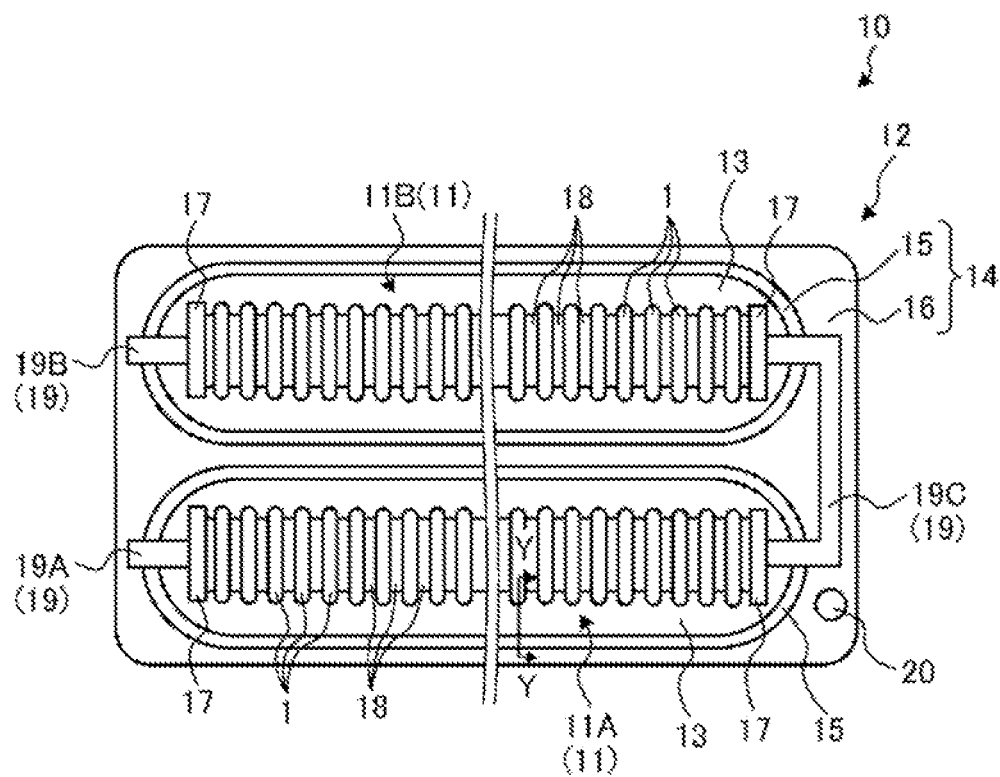
FIG. 2C is a top view illustrating the example of the cell stack device according to the embodiment.

Next, a cell stack device 10 according to the present embodiment using the cell 1 described above will be described with reference to FIGS. 2A to 2C. FIG. 2A is a perspective view illustrating an example of the cell stack device 10 according to the embodiment. FIG. 2B is a cross-sectional view taken along a line A-A illustrated in FIG. 2A. FIG. 2C is a top view illustrating the example of the cell stack device 10 according to the embodiment.

As illustrated in FIG. 2A, the cell stack device 10 includes a cell stack 11 that includes a plurality of the cells 1 arrayed (stacked) in the thickness direction T (see FIG. 1A) of the cell 1, and a fixing member 12.

The fixing member 12 includes a bonding material 13 and a support member 14. The support member 14 supports the cells 1. The bonding material 13 bonds the cells 1 with the support member 14. Further, the support member 14 includes a support body 15 and a gas tank 16. The support body 15 and the gas tank 16, which constitute the support member 14, are made of metal.

As illustrated in FIG. 2B, the support body 15 includes an insertion hole 15a into which the lower end portions of the plurality of cells 1 are inserted.

The lower end portions of the plurality of cells 1 and an inner wall of the insertion hole 15a are bonded by the bonding material 13.

The gas tank 16 includes an opening portion through which a reaction gas is supplied to the plurality of cells 1 via the insertion hole 15a, and a recessed groove 16a positioned in the periphery of the opening portion. An outer peripheral end portion of the support body 15 is fixed to the gas tank 16 by a fixing material 21 filled in the recessed groove 16a of the gas tank 16.

In the example illustrated in FIG. 2A, the fuel gas is stored in an internal space 22 formed by the support body 15 and the gas tank 16, which constitute the support member 14. The gas tank 16 includes a gas circulation pipe 20 connected thereto. The fuel gas is supplied to the gas tank 16 through this gas circulation pipe 20, and is supplied from the gas tank 16 to the gas-flow passages 2a (see FIG. 1A) inside the cells 1. The fuel gas supplied to the gas tank 16 is produced by a reformer 102 (see FIG. 11), which will be described below.

A hydrogen-rich fuel gas can be produced, for example, by steam reforming a raw fuel. When the fuel gas is produced by the steam reforming, the fuel gas contains steam.

In the example illustrated in FIG. 2A, two rows of the cell stacks 11, two of the support bodies 15, and the gas tank 16 are provided. Each of the two rows of the cell stacks 11 includes the plurality of cells 1. Each of the cell stacks 11 is fixed to a corresponding one of the support bodies 15. The gas tank 16 includes two through holes in an upper surface thereof. Each of the support bodies 15 is disposed in a corresponding one of the through holes. The internal space 22 is formed by the single gas tank 16 and the two support bodies 15.

The insertion hole 15a has, for example, an oval shape in a top surface view. The length of the insertion hole 15a, for example, in an array direction of the cells 1, that is, the thickness direction T thereof, is greater than the distance between two end current collectors 17 positioned at two ends of the cell stack 11. The width of the insertion hole 15a is, for example, greater than the length of the cell 1 in the width direction W (see FIG. 1A).

As illustrated in FIG. 2B, the bonding material 13 is filled and solidified in a bonding portion between the inner wall of the insertion hole 15a and the lower end portions of the cells 1. As a result, the inner wall of the insertion hole 15a and the lower end portions of the plurality of cells 1 are bonded and fixed, and the lower end portions of the cells 1 are bonded and fixed to each other. Each of the cells 1 includes, at the lower end portions thereof, the gas-flow passages 2a that communicate with the internal space 22 of the support member 14.

As the bonding material 13 and the fixing material 21, a material having a low conductivity such as glass can be used. As a specific material of the bonding material 13 and the fixing material 21, an amorphous glass or the like may be used, or particularly, a crystallized glass or the like may be used.

As the crystallized glass, for example, any one of $SiO_2$—CaO-based, MgO—$B_2O_3$-based, $La_2O_3$—$B_2O_3$—MgO-based, $La_2O_3$—$B_2O_3$—ZnO-based, and $SiO_2$—CaO—ZnO-based materials may be used, or particularly, a $SiO_2$—MgO-based material may be used.

Further, as illustrated in FIG. 2B, a conductive member 18 is interposed between the adjacent cells 1 of the plurality of cells 1. The conductive member 18 electrically connects in series the fuel electrode 3 of one of the adjacent cells 1 with the air electrode 5 of the other of the adjacent cells 1. More specifically, the conductive member 18 connects the interconnector 6 electrically connected to the fuel electrode 3 of the one of the adjacent cells 1 with the air electrode 5 of the other of the adjacent cells 1.

Further, as illustrated in FIG. 2B, the end current collectors 17 are electrically connected to the cells 1 positioned at the outermost sides in the array direction of the plurality of cells 1. The end current collectors 17 are each connected to an electrically conductive portion 19 protruding outward from the cell stack 11. The electrically conductive portion 19 collects electricity generated by the cells 1, and conducts the electricity to the outside. Note that in FIG. 2A, the end current collectors 17 are not illustrated.

Further, as illustrated in FIG. 2C, in the cell stack device 10, two cell stacks 11A and 11B, which are connected in series, function as one battery. Thus, the electrically conductive portion 19 of the cell stack device 10 is divided into a positive electrode terminal 19A, a negative electrode terminal 19B, and a connection terminal 19C.

The positive electrode terminal 19A functions as a positive electrode when the electrical power generated by the cell stack 11 is output to the outside, and is electrically connected to the end current collector 17 on a positive electrode side in the cell stack 11A. The negative electrode terminal 19B functions as a negative electrode when the electrical power generated by the cell stack 11 is output to the outside, and is electrically connected to the end current collector 17 on a negative electrode side in the cell stack 11B.

The connection terminal 19C electrically connects the end current collector 17 on a negative electrode side in the cell stack 11A and the end current collector 17 on a positive electrode side in the cell stack 11B.

Bonding Between Composite Member and Cell

Figure 3:
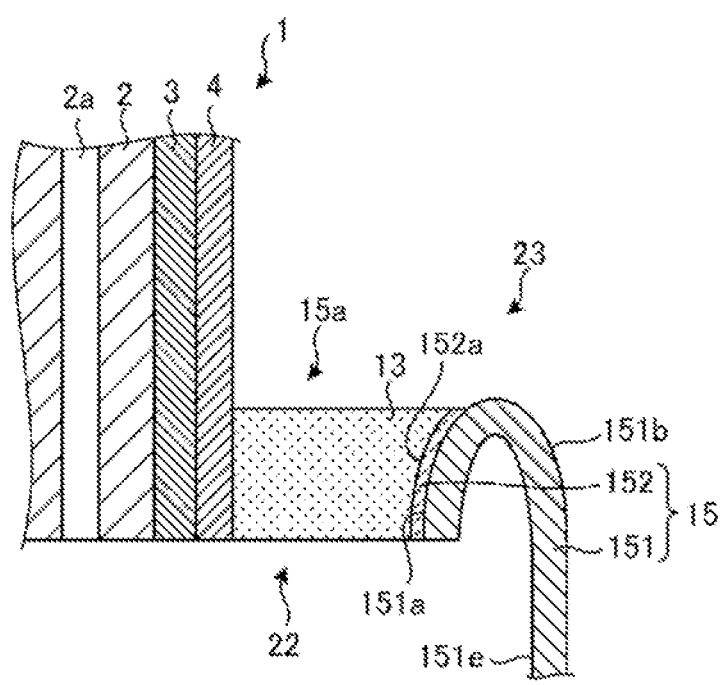
FIG. 3 is a cross-sectional view taken along a line Y-Y illustrated in FIG. 2C.

Next, bonding between a composite member and the cell will be described with reference to FIG. 3. FIG. 3 is a cross-sectional view taken along a line Y-Y illustrated in FIG. 2C.

As illustrated in FIG. 3, the support body 15 is bonded to the cell 1, which serves as a first cell, via the bonding material 13.

The support body 15 is a composite member including a base member 151 and a covering layer 152. The base member 151 has a thermal resistance. The base member 151 contains chromium. The base member 151 is, for example, stainless steel. The base member 151 may, for example, contain a metal oxide.

The covering layer 152 covers the base member 151. The covering layer 152 is positioned between a first surface 151a of the base member 151 and the bonding material 13.

The material of the covering layer 152 is, for example, an inorganic oxide. The inorganic oxide may be, for example, aluminum oxide (alumina), magnesium oxide (magnesia), silicon oxide (silica), zirconium oxide (zirconia), chromium oxide (chromia), titanium oxide (titania), or a composite oxide thereof. The zirconia may be partially stabilized zirconia. The composite oxide may be selected from forsterite, cordierite, and the like, for example. The material of the covering layer 152 may be a material having a low conductivity, or may be an insulating material. As a result of the material of the covering layer 152 being a material having a low conductivity or being an insulating material, the cell stack device 10 can be obtained that has a high withstand voltage and a high insulating resistance.

In particular, each of alumina and forsterite has a small difference in the thermal expansion coefficient with the base member 151, and when it is used for the covering layer 152, thermal stress generated between the covering layer 152 and the base member 151 due to a temperature difference decreases. Thus, the covering layer 152 can be firmly bonded to the base member 151, and the covering layer 152 is less likely to peel off from the base member 151.

Further, the bonding material 13 bonds the cell 1 serving as the first cell with the support body 15. The bonding material 13 is positioned between the solid electrolyte layer 4 of the cell 1 and the covering layer 152 of the support body 15, and bonds the cell 1 with a first surface 152a of the covering layer 152. The first surface 152a is an example of a first outer surface.

As a result of the covering layer 152 being positioned between the bonding material 13 and the base member 151, stress generated between the bonding material 13 and the base member 151 due to a difference in the thermal expansion coefficient is alleviated, and a likelihood of a crack occurring at the bonding material 13 is reduced.

However, since the support body 15 is formed from different materials, depending on the operating environment, unfortunately, a crack may occur at the covering layer 152, or the covering layer 152 may peel off from the base member 151. As a result, the leakage of the fuel gas may occur from a gap generated at the support body 15, and the durability of the cell stack device 10 may be still reduced. Further, the durability of the cell stack device 10 may be reduced as a result of the chromium (Cr) contained in the support body 15 being released into the oxidizing atmosphere, reaching the cell 1, and causing the performance of the cell 1 to deteriorate.

Therefore, in the embodiment, the surface roughness of a surface, of the base member 151, exposed to the oxidizing atmosphere is caused to be different from the surface roughness of a surface, of the base member 151, not exposed to the oxidizing atmosphere. In the embodiment, the first surface 151a, of the base member 151, that is not exposed to the oxidizing atmosphere as a result of facing the covering layer 152 has a surface roughness greater than the surface roughness of the surface of the other portions, of the base member 151, that are exposed to the oxidizing atmosphere, such as the surface roughness of the second surface 151b, for example.

As a result, the adhesiveness between the covering layer 152 and the base member 151 can be increased. Thus, the covering layer 152 becomes less likely to peel off from the base member 151, or the leakage of the fuel gas can be made less likely to occur due to the breakage of the covering layer 152. Thus, according to the embodiment, the durability of the support body 15 can be improved.

On the other hand, of the base member 151, the second surface 151b on which the covering layer 152 is not positioned is exposed to an external space 23. The external space 23 is a space to which the air electrode 5 of the cell 1 (see FIG. 1) is exposed, and is filled with an oxygen-containing gas such as air. In other words, the external space 23 is an oxidizing atmosphere.

The specific surface area of the base member 151, which is used in such an environment, may be reduced by reducing the surface roughness of the second surface 151b exposed to the oxidizing atmosphere of the external space 23. For example, in the embodiment, the second surface 151b has a surface roughness smaller than that of the first surface 151a.

As a result, during a high-temperature operation, the chromium (Cr) contained in the base member 151 can be made less likely to be released into the external space 23, which is the oxidizing atmosphere. Thus, according to the embodiment, the performance of the cell 1 is less likely to deteriorate, and thus, the durability of the cell stack device 10 can be improved.

Various Modified Examples

Figure 4A:
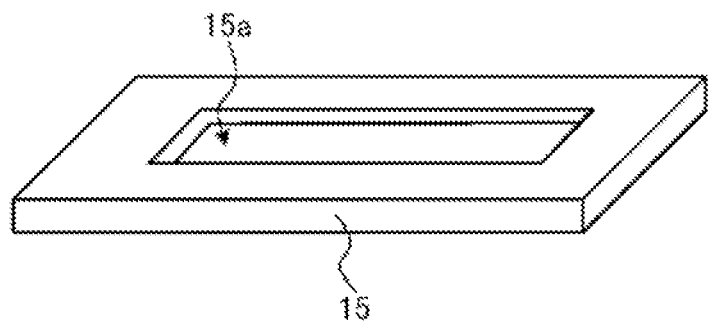
FIG. 4A is a perspective view illustrating one example of a composite member.
Figure 4B:
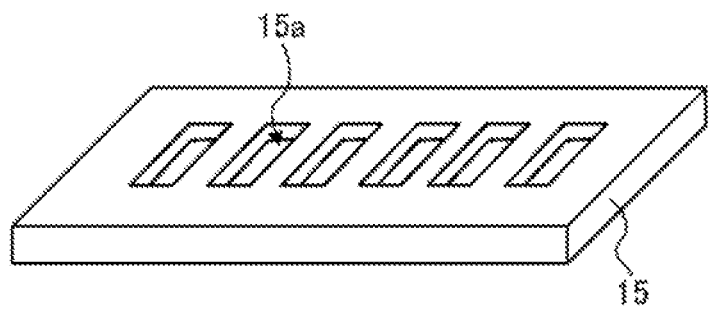
FIG. 4B is a perspective view illustrating one example of the composite member.

Next, the support body 15 according to various modified examples of the embodiment will be described with reference to FIGS. 4A to 10C. FIG. 4A and FIG. 4B are perspective views illustrating other examples of the composite member.

As illustrated in FIG. 4A, when the support body 15 having a flat plate shape is used, an internal space 22 (see FIG. 4C) is formed as a result of the gas tank 16 (see FIG. 2A) being bonded to the lower surface of the support body 15 having the flat plate shape. Further, the support body 15 illustrated in FIG. 4B includes a plurality of the insertion holes 15a. In this case, the cells 1 may be inserted into the plurality of insertion holes 15a of the support body 15 in a one-to-one manner, or a plurality of the cells 1 may be inserted into each of the plurality of insertion holes 15a of the support body 15.

Figure 4C:
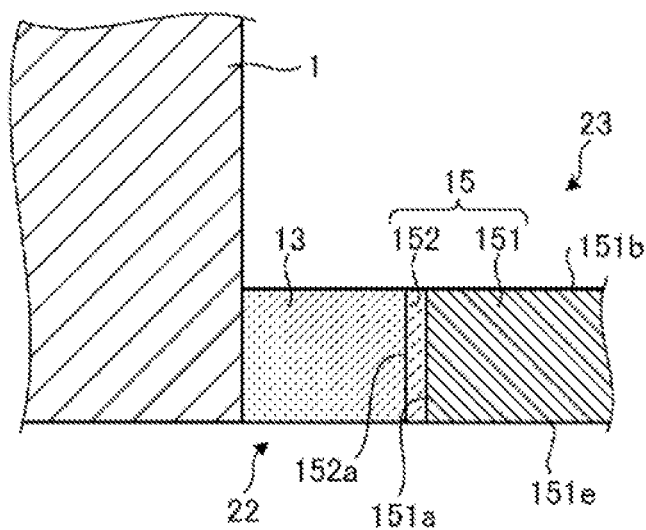
FIG. 4C is an enlarged cross-sectional view of a bonding portion between the composite member as one example and the cell.

FIG. 4C is an enlarged cross-sectional view of a bonding portion between the composite member as another example and the cell. As illustrated in FIG. 4C, the support body 15 has a flat plate shape. The support body 15 is bonded to the cell 1 by the bonding material 13.

The support body 15 includes the base member 151 and the covering layer 152. The base member 151 includes the first surface 151a, the second surface 151b, and an inner surface 151e. The first surface 151a faces the covering layer 152. The second surface 151b is exposed to the oxidizing atmosphere of the external space 23. The inner surface 151e is exposed to a reducing atmosphere of the internal space 22.

The covering layer 152 covers the base member 151. The covering layer 152 is positioned between a first surface 151a of the base member 151 and the bonding material 13.

Further, the bonding material 13 bonds the cell 1 with the support body 15. The bonding material 13 is positioned between the solid electrolyte layer 4 of the cell 1 (see FIG. 1A) and the covering layer 152 of the support body 15, and bonds the cell 1 with the first surface 152a, which serves as the first outer surface of the covering layer 152.

In the support body 15 according to the embodiment, the first surface 151a of the base member 151 has a surface roughness greater than that of the second surface 151b, of the base member 151, that is exposed to the oxidizing atmosphere of the external space 23.

As a result of the surface roughness of the first surface 151a facing the covering layer 152 being greater than the surface roughness of the second surface 151b, the covering layer 152 can be made less likely to peel off from the base member 151, or the leakage of the fuel gas can be made less likely to occur due to the breakage of the covering layer 152. Thus, according to the embodiment, the durability of the support body 15 can be improved.

Furthermore, as a result of the surface roughness of the second surface 151b being smaller than the surface roughness of the first surface 151a, during the high-temperature operation, the chromium (Cr) contained in the base member 151 can be made less likely to be released into the oxidizing atmosphere of the external space 23. Thus, according to the embodiment, the performance of the cell 1 is less likely to deteriorate, and thus, the durability of the cell stack device 10 can be improved.

Figure 5A:
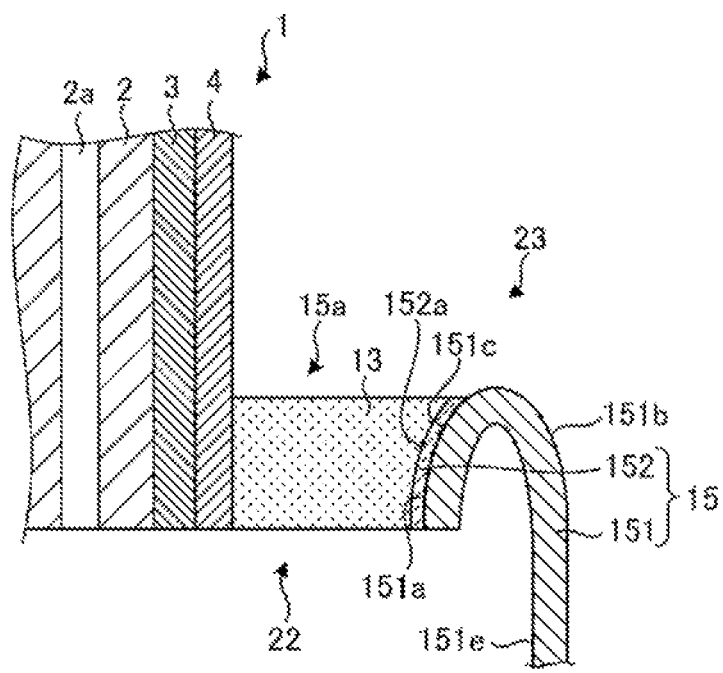
FIG. 5A is an enlarged cross-sectional view of a bonding portion between the composite member according to a first modified example of the embodiment and the cell.
Figure 5B:
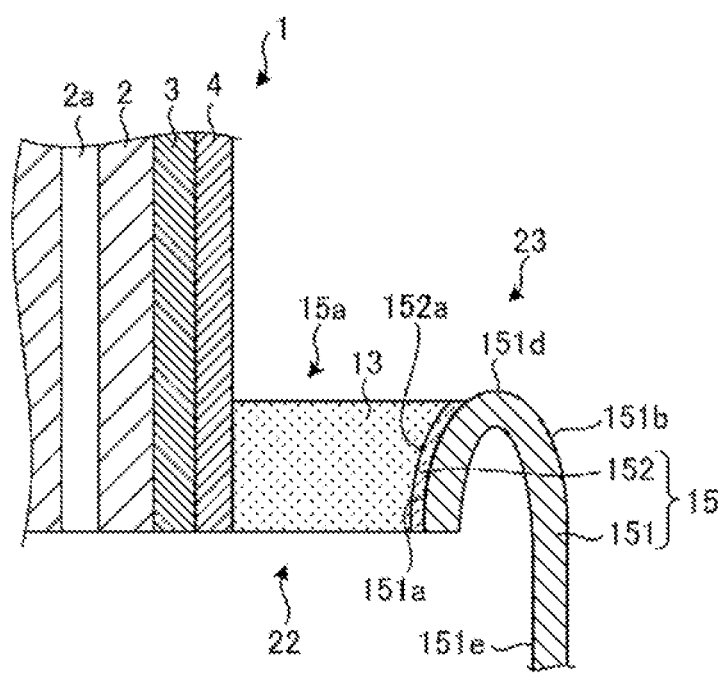
FIG. 5B is an enlarged cross-sectional view of a bonding portion between the composite member according to a second modified example of the embodiment and the cell.
Figure 6A:
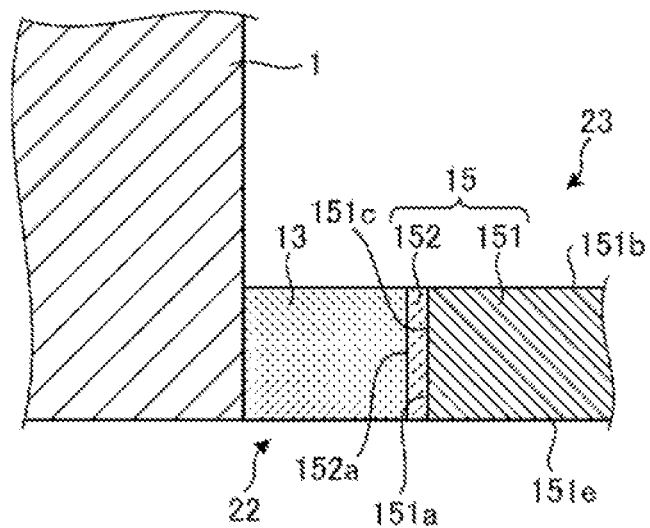
FIG. 6A is an enlarged cross-sectional view of a bonding portion between the composite member as another example according to a third modified example of the embodiment and the cell.
Figure 6B:
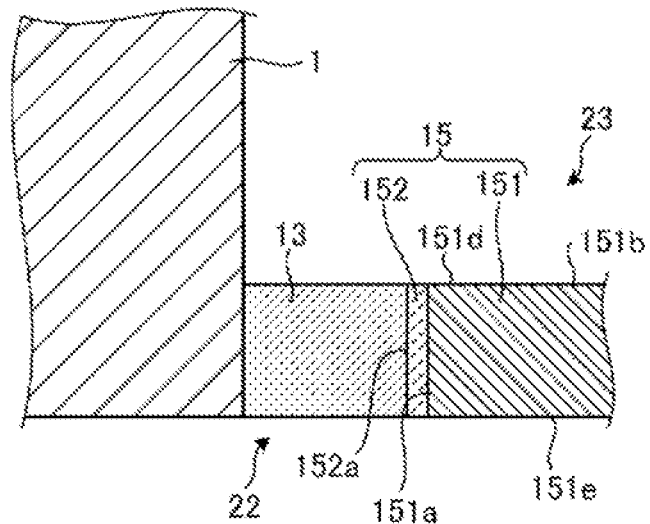
FIG. 6B is an enlarged cross-sectional view of a bonding portion between the composite member as another example according to a fourth modified example of the embodiment and the cell.

FIG. 5A and FIG. 5B are each an enlarged cross-sectional view of a bonding portion between the composite member according to second and third modified examples of the embodiment, and the cell. FIG. 6A and FIG. 6B are each an enlarged cross-sectional view of a bonding portion between the composite member as another example according to fourth and fifth modified examples of the embodiment, and the cell.

As illustrated in FIG. 5A and FIG. 6A, the base member 151 of the support body 15 may further include an intermediate surface 151c positioned between the first surface 151a and the second surface 151b. The intermediate surface 151c is an example of a third surface.

The intermediate surface 151c faces the covering layer 152. The intermediate surface 151c has a surface roughness smaller than that of the first surface 151a, for example.

The intermediate surface 151c is positioned at a portion closer to the oxidizing atmosphere than the first surface 151a. For example, during the high-temperature operation, the chromium (Cr) contained in the base member 151 may unfortunately be released into the oxidizing atmosphere of the external space 23 via an interface between the covering layer 152 and the base member 151 and a portion in the vicinity thereof. By making the surface roughness of the intermediate surface 151c, of the base member 151 facing the covering layer 152, smaller than that of the first surface 151a positioned at a portion away from the oxidizing atmosphere, for example, during the high-temperature operation, the chromium (Cr) contained in the base member 151 can be made less likely to be released into the oxidizing atmosphere of the external space 23. Thus, according to the embodiment, the performance of the cell 1 is less likely to deteriorate, and thus, the durability of the cell stack device 10 can be improved. Note that the surface roughness of the intermediate surface 151c may be the same as the surface roughness of the second surface 151b, for example. Further, the intermediate surface 151c may have an intermediate surface roughness between the surface roughness of the first surface 151a and the surface roughness of the second surface 151b, for example.

On the other hand, as illustrated in FIG. 5B and FIG. 6B, the base member 151 of the support body 15 may further include an intermediate surface 151d positioned between the first surface 151a and the second surface 151b. The intermediate surface 151d is an example of the third surface.

The intermediate surface 151d is exposed to the oxidizing atmosphere of the external space 23. The intermediate surface 151d may have a surface roughness greater than that of the second surface 151b, for example. Note that the surface roughness of the intermediate surface 151d may be the same as the surface roughness of the first surface 151a, for example. Further, the intermediate surface 151d may have an intermediate surface roughness between the surface roughness of the first surface 151a and the surface roughness of the second surface 151b, for example.

Further, in each of the modified examples illustrated in FIGS. 5A to 6B, an example including only one of the intermediate surfaces 151c and 151d is illustrated, but both the intermediate surfaces 151c and 151d may be provided therein.

Figure 6C:
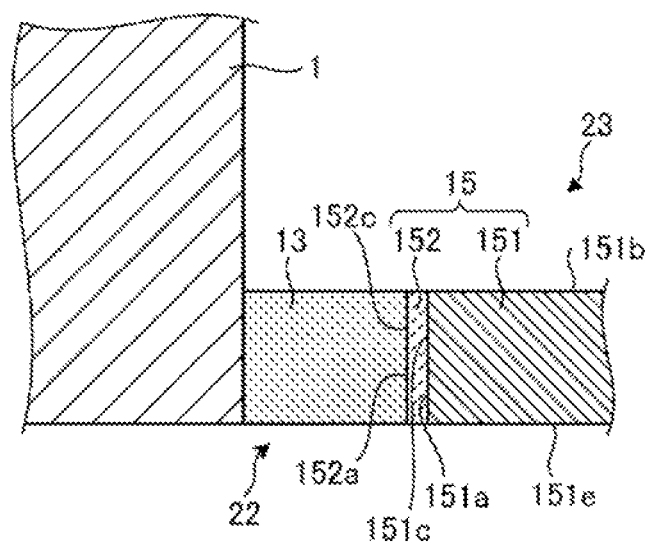
FIG. 6C is an enlarged cross-sectional view of a bonding portion between the composite member as another example according to a fifth modified example of the embodiment and the cell.

FIG. 6C is an enlarged cross-sectional view of a bonding portion between the composite member as another example according to a fifth modified example of the embodiment and the cell.

As illustrated in FIG. 6C, the support body 15 in FIG. 6C has the same configuration as that of the support body 15 illustrated in FIG. 6A, except that the covering layer 152 of the support body 15 is positioned closer to the oxidizing atmosphere of the external space 23 than the first surface 152a, and that a surface 152c facing the bonding material 13 is provided therein.

The surface 152c may have a surface roughness smaller than that of the first surface 152a, for example. Of the covering layer 152 facing the bonding material 13, by making the surface roughness of the surface 152c smaller than that of the first surface 152a positioned at a portion away from the oxidizing atmosphere, for example, during a high-temperature operation, the chromium (Cr) contained in the base member 151 can be made even less likely to be released into the oxidizing atmosphere of the external space 23. Thus, according to the embodiment, the performance of the cell 1 is less likely to deteriorate, and thus, the durability of the cell stack device 10 can be improved.

Further, the surface 152c may have a surface roughness greater than that of the first surface 152a, for example. Of the covering layer 152 facing the bonding material 13, by making the surface roughness of the surface 152c greater than that of the first surface 152a, for example, the adhesiveness between the bonding material 13 positioned at a portion close to the oxidizing atmosphere and the covering layer 152 of the support body 15 can be increased. Thus, the bonding material 13 and the covering layer 152 of the support body 15 become less likely to peel off from each other, or the bonding material 13 or the covering layer 152 becomes less likely to break. As a result, the leakage of the fuel gas can be made less likely to occur. Thus, according to the embodiment, the durability of the support body 15 can be improved.

Figure 7:
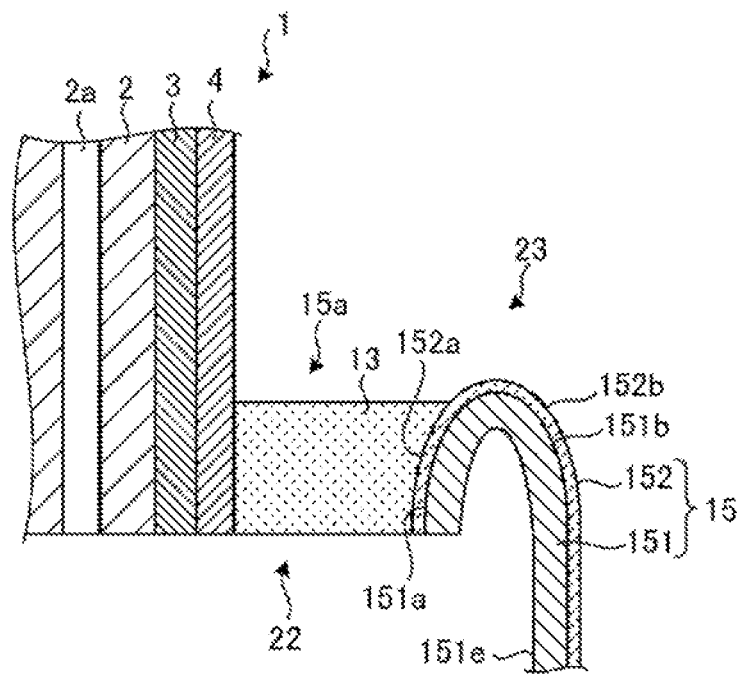
FIG. 7 is an enlarged cross-sectional view of a bonding portion between the composite member according to a sixth modified example of the embodiment and the cell.
Figure 8:
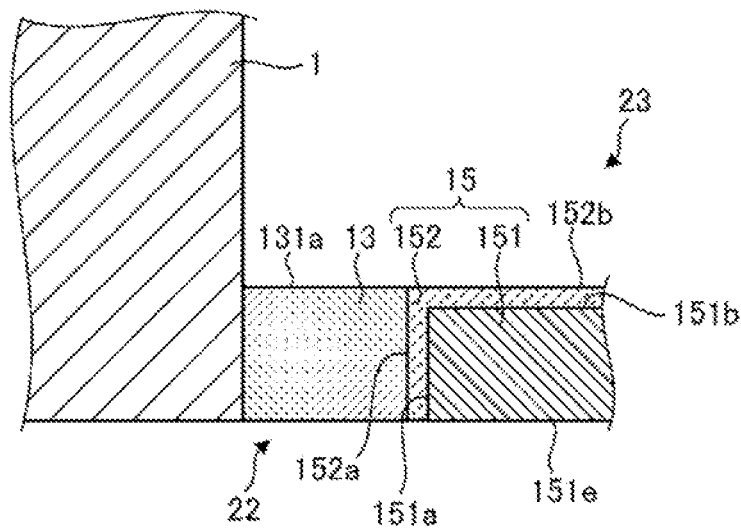
FIG. 8 is an enlarged cross-sectional view of a bonding portion between the composite member as another example according to a seventh modified example of the embodiment and the cell.

FIG. 7 is an enlarged cross-sectional view illustrating a bonding portion between the composite member according to a sixth modified example of the embodiment and the cell. FIG. 8 is an enlarged cross-sectional view of a bonding portion between the composite member as another example according to a seventh modified example of the embodiment and the cell.

As illustrated in FIG. 7 and FIG. 8, the support bodies 15 in FIG. 7 and FIG. 8 have the same configuration as those of the support bodies 15 illustrated in FIG. 3 and FIG. 4C, except that the covering layer 152 of the support body 15 further covers the second surface 151b of the base member 151.

The covering layer 152 includes the first surface 152a facing the bonding material 13, and a second surface 152b exposed to the oxidizing atmosphere of the external space 23. The first surface 152a is an example of the first outer surface. The second surface 152b is an example of a second outer surface.

In the support bodies 15 according to the sixth and seventh modified examples of the embodiment, the surface roughness of a surface, of the covering layer 152, that is exposed to the oxidizing atmosphere is different from the surface roughness of a surface, of the base member 151, that is not exposed to the oxidizing atmosphere. For example, the surface roughness of the second surface 151b, of the base member 151, that is not exposed to the oxidizing atmosphere is greater than the surface roughness of the second surface 152b, of the covering layer 152, that is exposed to the oxidizing atmosphere.

As a result of the surface roughness of the second surface 151b facing the covering layer 152 being greater than the surface roughness of the second surface 152b, the adhesiveness between the covering layer 152 and the base member 151 is increased. Thus, the covering layer 152 becomes less likely to peel off from the base member 151, or the covering layer 152 becomes less likely to break. As a result, the leakage of the fuel gas can be made less likely to occur. Thus, according to the embodiment, the durability of the support body 15 can be improved. Further, during the high-temperature operation, the chromium (Cr) contained in the base member 151 can be made less likely to be released into the oxidizing atmosphere of the external space 23 through a peeled or broken portion. Thus, according to the embodiment, the performance of the cell 1 is less likely to deteriorate, and thus, the durability of the cell stack device 10 can be improved.

Furthermore, as a result of the surface roughness of the second surface 152b, which is exposed to the oxidizing atmosphere of the external space 23, being smaller than the surface roughness of the second surface 151b covered by the covering layer 152, during the high-temperature operation, the chromium (Cr) contained in the base member 151 can be made less likely to be released into the oxidizing atmosphere of the external space 23 via the second surface 152b of the covering layer 152. Thus, according to the embodiment, the durability of the support body 15 can be improved, and thus, the durability of the cell stack device 10 can be improved.

On the other hand, in the support bodies 15 according to the sixth and seventh modified examples of the embodiment, for example, the surface roughness of the first surface 152a, of the covering layer 152, that is not exposed to the oxidizing atmosphere may be greater than the surface roughness of the second surface 152b, of the covering layer 152, that is exposed to the oxidizing atmosphere.

As a result of the surface roughness of the first surface 152a facing the bonding material 13 being greater than the surface roughness of the second surface 152b exposed to the oxidizing atmosphere of the external space 23, the adhesiveness between the covering layer 152 and the bonding material 13 is increased. Thus, the bonding material 13 becomes less likely to peel off from the base member 151, or the covering layer 152 becomes less likely to break. As a result, the leakage of the fuel gas can be made less likely to occur. Thus, according to the embodiment, the durability of the support body 15 can be improved.

Furthermore, as a result of the surface roughness of the second surface 152b being smaller than the surface roughness of the first surface 152a, during the high-temperature operation, the chromium (Cr) contained in the base member 151 can be made less likely to be released into the oxidizing atmosphere of the external space 23 via the covering layer 152. Thus, according to the embodiment, the performance of the cell 1 is less likely to deteriorate, and thus, the durability of the cell stack device 10 can be improved.

Note that in the support bodies 15 illustrated in FIG. 7 and FIG. 8, the second surface 151b of the base member 151 may have a surface roughness greater than or equal to that of the first surface 151a. However, when the surface roughness of the second surface 151b is caused to be smaller than the surface roughness of the first surface 151a, during the high-temperature operation, the chromium (Cr) contained in the base member 151 can be made even less likely to be released into the oxidizing atmosphere of the external space 23. Thus, according to the embodiment, the performance of the cell 1 is less likely to deteriorate, and thus, the durability of the cell stack device 10 can be improved.

Further, in the modified example illustrated in FIG. 8, an end surface 131a, of the bonding material 13, exposed to the oxidizing atmosphere of the external space 23 is positioned on the same plane as the second surface 152b of the covering layer 152. However, the configuration is not limited thereto, and for example, the second surface 152b may be positioned so as to protrude from the end surface 131a toward the external space 23 side, that is the oxidizing atmosphere side.

Figure 9A:
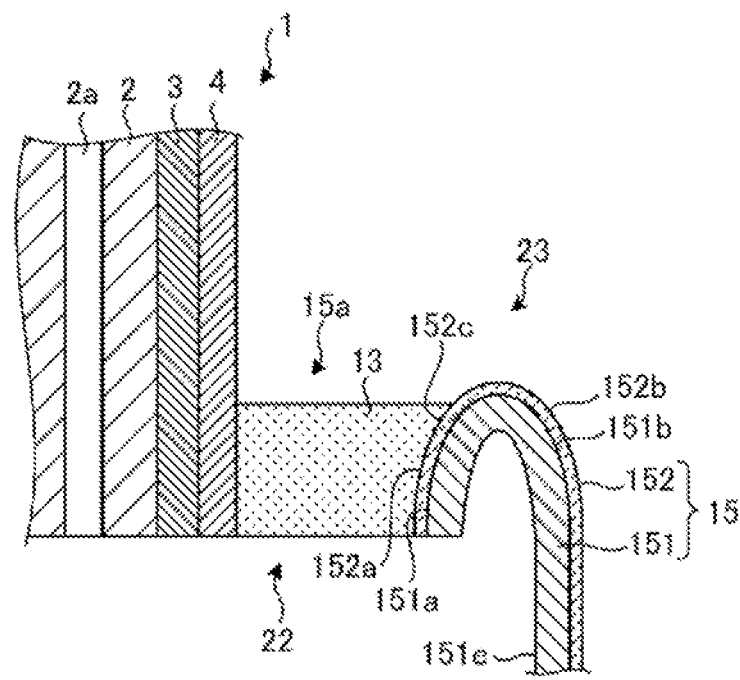
FIG. 9A is an enlarged cross-sectional view of a bonding portion between the composite member according to an eighth modified example of the embodiment and the cell.
Figure 9B:
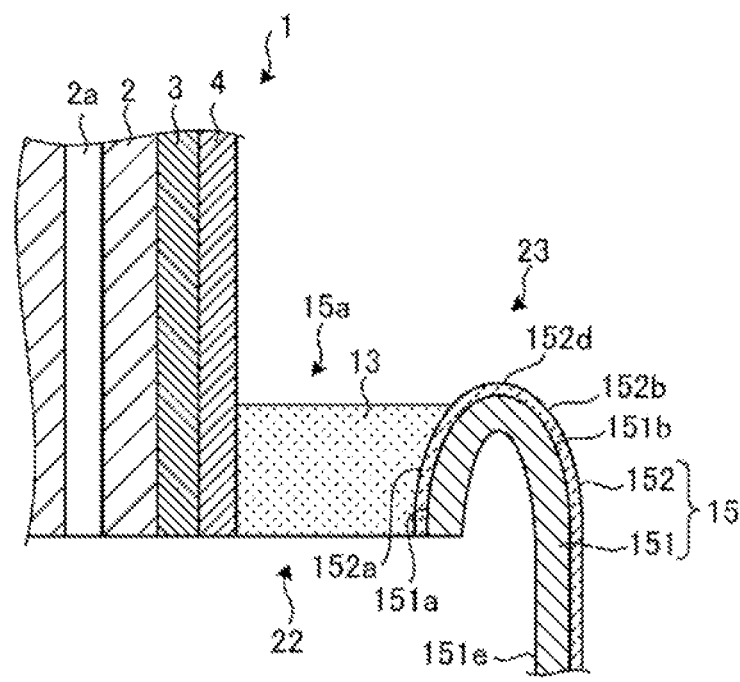
FIG. 9B is an enlarged cross-sectional view of a bonding portion between the composite member according to a ninth modified example of the embodiment and the cell.
Figure 10A:
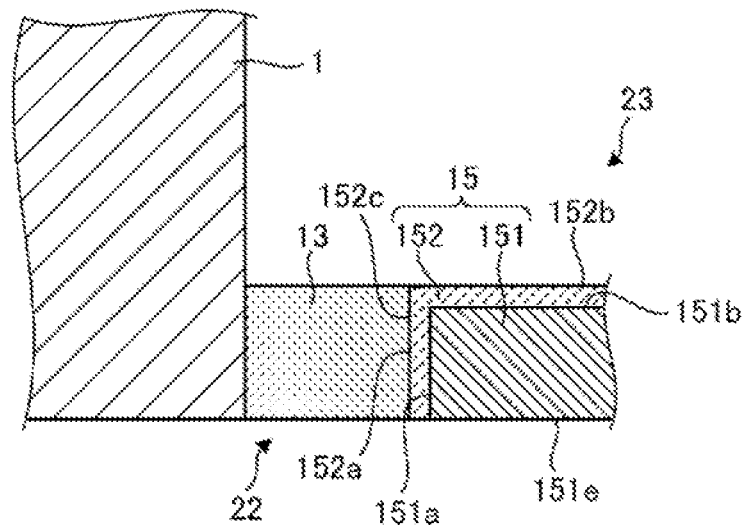
FIG. 10A is an enlarged cross-sectional view of a bonding portion between the composite member as another example according to a tenth modified example of the embodiment and the cell.
Figure 10B:
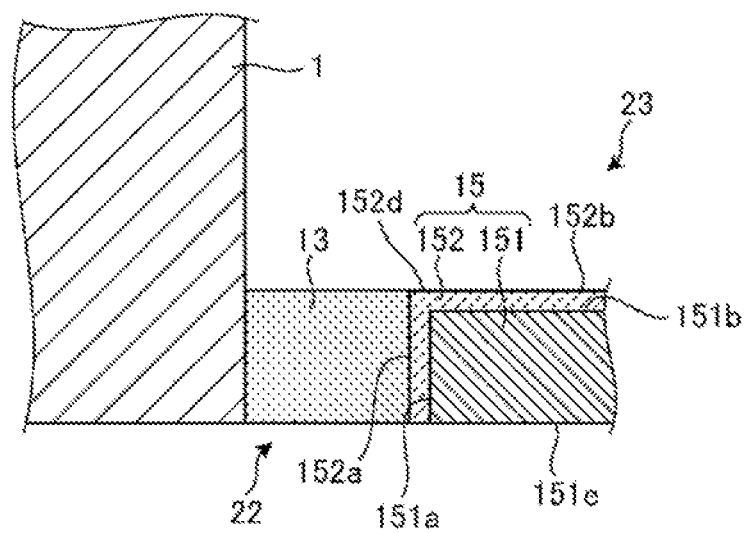
FIG. 10B is an enlarged cross-sectional view of a bonding portion between the composite member as another example according to an eleventh modified example of the embodiment and the cell

FIG. 9A and FIG. 9B are each an enlarged cross-sectional view of a bonding portion between the composite member according to eighth and ninth modified examples of the embodiment, and the cell. FIG. 10A and FIG. 10B are each an enlarged cross-sectional view of a bonding portion between the composite member as another example according to tenth and eleventh modified examples of the embodiment, and the cell.

As illustrated in FIG. 9A and FIG. 10A, the covering layer 152 of the support body 15 may further include the surface 152c, which is an intermediate surface positioned between the first surface 152a and the second surface 152b. The surface 152c is an example of a third outer surface.

The surface 152c faces the bonding material 13. The surface 152c may have a surface roughness smaller than that of the first surface 152a, for example.

Further, the surface 152c is positioned at a portion closer to the oxidizing atmosphere than the first surface 152a. For example, during the high-temperature operation, the chromium (Cr) contained in the base member 151 may be unfortunately released into the external space 23, which is the oxidizing atmosphere, via the interface between the bonding material 13 and the covering layer 152 and the portion in the vicinity thereof. By making the surface roughness of the surface 152c, of the covering layer 152 facing the bonding material 13, smaller than that of the first surface 152a positioned at a portion away from the oxidizing atmosphere of the external space 23, for example, during the high-temperature operation, the chromium (Cr) contained in the base member 151 can be inhibited from being released into the oxidizing atmosphere via the interface between the bonding material 13 and the covering layer 152 and the portion in the vicinity thereof. Thus, according to the embodiment, the performance of the cell 1 is less likely to deteriorate, and thus, the durability of the cell stack device 10 can be improved. Note that the surface roughness of the surface 152c may be the same as the surface roughness of the second surface 152b, for example. Further, the surface 152c may have an intermediate surface roughness between the surface roughness of the first surface 152a and the surface roughness of the second surface 152a, for example.

On the other hand, as illustrated in FIGS. 9B and 10B, the covering layer 152 of the support body 15 may further include an intermediate surface 152d positioned between the first surface 152a and the second surface 152b. The intermediate surface 152d is an example of the third outer surface.

The intermediate surface 152d is exposed to the oxidizing atmosphere of the external space 23. The intermediate surface 152d has a surface roughness greater than the second surface 152b, for example. Also, in a case in which the intermediate surface 152d is provided, during the high-temperature operation, the chromium (Cr) contained in the base member 151 can be made less likely to be released into the oxidizing atmosphere of the external space 23. Thus, according to the embodiment, the performance of the cell 1 is less likely to deteriorate, and thus, the durability of the cell stack device 10 can be improved. Note that the surface roughness of the intermediate surface 152d may be the same as the surface roughness of the first surface 152a, for example. Additionally, the intermediate surface 152d may have an intermediate surface roughness between the surface roughness of the first surface 152a and the surface roughness of the second surface 152b, for example.

Further, in each of the modified examples in FIGS. 9A to 10B, an example including the surface 152c or the intermediate surface 152d is illustrated, but both the surface 152c and the intermediate surfaces 152d may be provided therein.

Figure 10C:
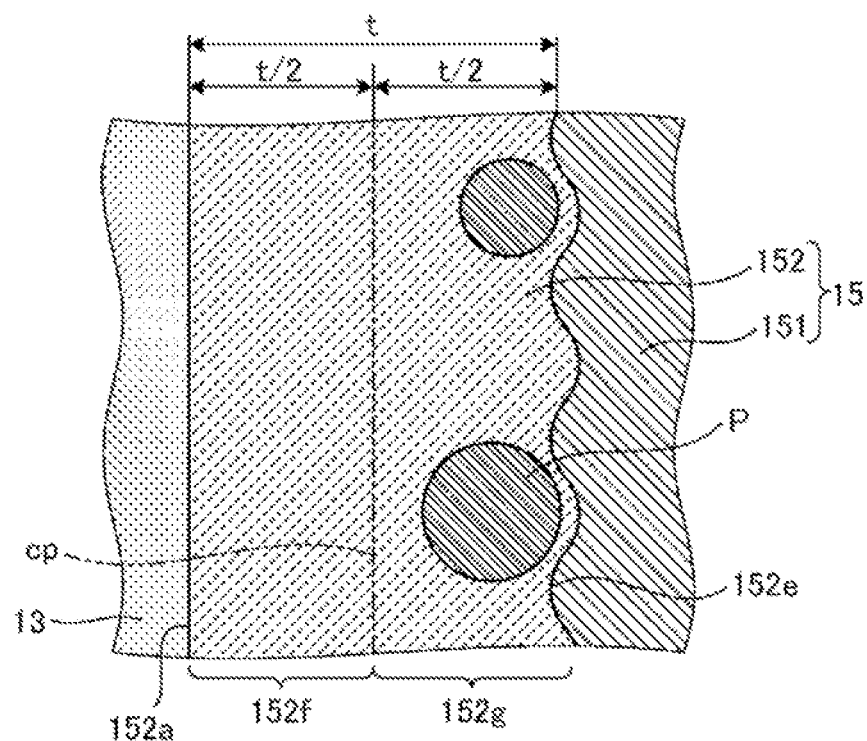
FIG. 10C is an enlarged cross-sectional view of the composite member according to a twelfth modified example of the embodiment.

FIG. 10C is an enlarged cross-sectional view illustrating the composite member according to a twelfth modified example of the embodiment. As illustrated in FIG. 10C, the covering layer 152 may include one or a plurality of particle bodies P. When a portion positioned between the first surface 152a and an inner surface 152e of the covering layer 152 is defined as an intermediate portion cp, the particle body P is positioned in an inner region 152g extending from the intermediate portion cp to the inner surface 152e.

Further, the material of the particle body P is, for example, alumina or silicon carbide. The material of the particle body P is not positioned in an outer region 152f extending from the first surface 152a to the intermediate portion cp and the base member 151. When a gap between the first surface 152a and the inner surface 152e is defined as t, the particle body P is positioned in the inner region 152g, which is a portion positioned within a distance of t/2 from the inner surface 152e. In other words, the particle size of the particle body P is t/2 or less.

By positioning the particle body P in the inner region 152g of the covering layer 152 in this manner, for example, the adhesiveness between the covering layer 152 and the base member 151 is improved. Thus, according to the embodiment, the durability of the support body 15 can be improved, and thus, the durability of the cell stack device 10 can be improved. Note that in FIG. 10C, an example is illustrated in which the particle bodies P are positioned between the inner surface 152e facing the base member 151 and the first surface 152a. However, the configuration is not limited thereto, and the particle body P may be positioned between the inner surface 152e and the second surface 152b.

Evaluation Method

Here, the magnitude of the surface roughness of each of the aforementioned surfaces (the first surface 151a, the second surface 151b, the intermediate surfaces 151c and 151d, the first surface 152a, the second surface 152b, the surface 152c, and the intermediate surface 152d) and of each of surfaces to be described below can be determined based on the arithmetic average roughness Ra prescribed in JIS B0633; 2001. The arithmetic average roughness Ra is calculated by image analysis of a cross-section perpendicular to each of the surfaces. First, the support body 15 and the bonding material are cut out and embedded in a resin. Then, a cross-section perpendicular to a surface whose surface roughness to be measured is polished using abrasive grains, a wrapping film (approximately 48000), or the like to obtain a cross-section having a mirror state. An image of the obtained cross-section is captured using a scanning electron microscope, an optical microscope, or the like, and the arithmetic average roughness Ra of each of the surfaces can be calculated by image analysis of the captured image.

Surface Roughness of Each Surface

The surface roughness (the arithmetic average roughness Ra), calculated in the aforementioned manner, of each of the aforementioned surfaces (the first surface 151a, the second surface 151b, the intermediate surfaces 151c and 151d, the first surface 152a, the second surface 152b, the surface 152c, and the intermediate surface 152d) and of each of the surfaces to be described below may be, for example, from 0.1 μm to 30 μm. Of the first surface 151a and the second surface 151b, one of the surface roughnesses (the arithmetic average roughnesses Ra) may be, for example, from 0.1 μm to 30 μm. Further, of the first surface 152a and the second surface 152b, one of the surface roughnesses (the arithmetic average roughnesses Ra) may be, for example, from 0.1 μm to 30 μm. Further, of the second surface 151b and the second surface 152b, one of the surface roughnesses (the arithmetic average roughnesses Ra) may be, for example, from 0.1 μm to 30 μm. Furthermore, each of the surfaces to be described below can have a surface roughness (the arithmetic average roughness Ra) similar to that of each of the aforementioned surfaces.

Manufacturing Method

For the first surface 151a and the second surface 151b of the base member 151 according to the embodiment, for example, of the surface of the base member 151 positioned on the external space 23 side, which is the oxidizing atmosphere side, by performing a roughening treatment, such as sand blasting, on a portion corresponding to the first surface 151a, the first surface 151a is formed, and the remaining portion can be used as the second surface 151b. Further, for example, of the surface of the base member 151 positioned on the external space 23 side, which is the oxidizing atmosphere side, by performing a polishing treatment on a portion corresponding to the second surface 151b, the second surface 151b may be formed, and the remaining portion may be used as the first surface 151a. Further, for example, of the surface of the base member 151 positioned on the external space 23 side, which is the oxidizing atmosphere side, by performing different surface treatments on the portions corresponding to the first surface 151a and the second surface 151b, respectively, each of the first surface 151a and the second surface 151b may be formed. Furthermore, the intermediate surfaces 151c and 151d positioned between the first surface 151a and the second surface 151b can also be formed using a combination of the aforementioned manufacturing methods of the first surface 151a and the second surface 151b in an appropriate manner.

Further, the covering layer 152 according to the embodiment can be positioned by a method such as a thermal spraying method, a vapor deposition method, an electrodeposition method, or a sputtering method. Further, for example, a covering material may be coated on the surface of the base member 151, and then may be fired to form the covering layer 152.

Further, the first surface 152a and the second surface 152b of the covering layer 152 can be formed, for example, based on a difference between the surface roughnesses of the first surface 151a and the second surface 151b of the base member 151 corresponding to the first surface 152a and the second surface 152b. Further, the first surface 152a and the second surface 152b may be formed by making the thickness of a portion corresponding to the second surface 152b greater than the thickness of a portion corresponding to the first surface 152a. Further, for example, of the surface of the covering layer 152, by performing a polishing treatment on the portion corresponding to the second surface 152b, the second surface 152b may be formed, and the remaining portion may form the first surface 152a. Furthermore, each of the first surface 152a and the second surface 152b may be formed by changing various conditions when forming the aforementioned covering layer 152. Furthermore, the surface 152c and the intermediate surface 152d positioned between the first surface 152a and the second surface 152b can also be formed using a combination of the aforementioned manufacturing methods of the first surface 152a and the second surface 152b in an appropriate manner.

Module

Figure 11:
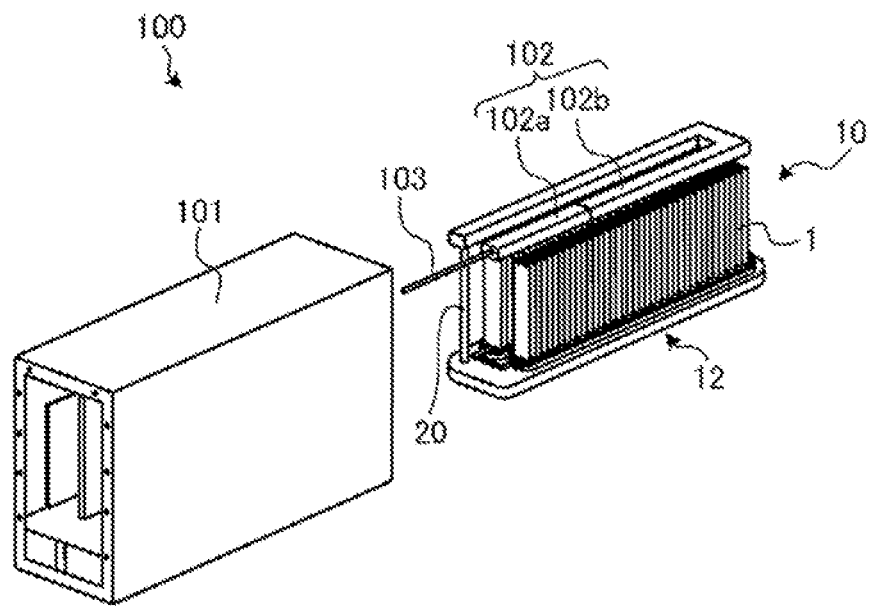
FIG. 11 is an external perspective view illustrating an example of a module according to the embodiment.

Next, a module 100 according to the embodiment of the present disclosure in which the aforementioned cell stack device 10 is used will be described with reference to FIG. 11. FIG. 11 is an external perspective view illustrating the module according to the embodiment, and illustrates a state in which a front surface and a rear surface, which are parts of a housing container 101, are removed and the cell stack device 10, which is a fuel cell housed inside the module, is extracted to the rear.

As illustrated in FIG. 11, the module 100 is constituted by the cell stack device 10 being housed inside the housing container 101. Further, the reformer 102 for generating the fuel gas to be supplied to the cells 1 is disposed above the cell stack device 10.

The reformer 102 reforms a raw fuel such as natural gas or kerosene supplied via a raw fuel supply pipe 103, and produces the fuel gas. Note that the reformer 102 preferably has a structure capable of performing steam reforming, which is an efficient reformation reaction. The reformer 102 can perform the steam reforming by including a vaporizing unit 102a that vaporizes water, and a reforming unit 102b in which a reforming catalyst (not illustrated) is disposed for reforming the raw fuel into the fuel gas.

Then, the fuel gas produced by the reformer 102 is supplied to the fixing member 12 via the gas circulation pipe 20, and the fuel gas is supplied via the fixing member 12 to the gas-flow passages 2a (see FIG. 1A) formed inside the cells 1.

Further, in the module 100 having the aforementioned configuration, during normal power generation, a temperature in the module 100 rises to approximately 500 to 1000° C. due to combustion and power generation in the cells 1.

With the module 100 having such a configuration, as described above, the module 100 can be configured to suppress a deterioration in battery performance by being constituted by the cell stack device 10 that suppresses the deterioration in battery performance.

Module Housing Device

Figure 12:
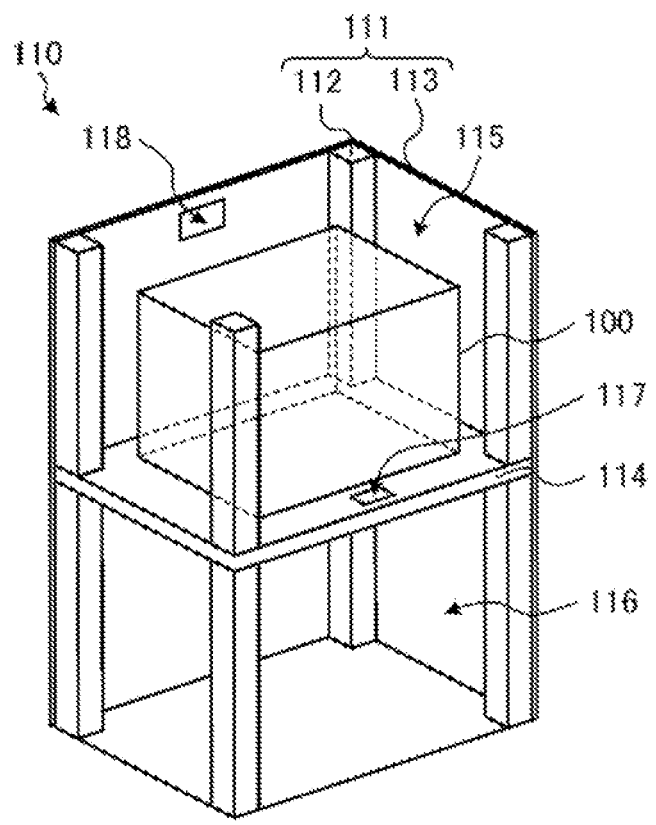
FIG. 12 is an exploded perspective view schematically illustrating an example of a module housing device according to the embodiment.

FIG. 12 is an exploded perspective view illustrating an example of a module housing device according to the embodiment. A module housing device 110 according to the embodiment includes an external case, the module 100 illustrated in FIG. 11, and an auxiliary device (not illustrated). The auxiliary device operates the module 100. The module 100 and the auxiliary device are housed inside the external case. Note that a part of the configuration is not illustrated in FIG. 12.

The external case of the module housing device 110 illustrated in FIG. 12 includes a column 111 and an external plate 112. A dividing plate 113 vertically divides the interior of the external case. A space above the dividing plate 113 inside the external case is a module housing chamber 114 that houses the module 100, and a space below the dividing plate 113 inside the external case is an auxiliary device housing chamber 115 that houses the auxiliary device that operates the module 100. Note that FIG. 12 does not illustrate the auxiliary device housed in the auxiliary device housing chamber 115.

Further, the dividing plate 113 includes an air circulation hole 116 that causes air in the auxiliary device housing chamber 115 to flow into the module housing chamber 114 side. The external plate 112 constituting the module housing chamber 114 includes an exhaust hole 117 that exhausts air inside the module housing chamber 114.

With the module housing device 110 having such a configuration, as described above, the module housing device 110 can suppress the deterioration in battery performance by including, in the module housing chamber 114, the module 100 that suppresses the deterioration in battery performance.

Other Modified Examples

Next, cell stack devices according to other modified examples of the embodiment will be described with reference to FIGS. 13A to 13D.

In the aforementioned embodiment, a so-called "vertical stripe type" is exemplified in which only one of the element portions each including the fuel electrode, the solid electrolyte layer, and the air electrode is provided on the surface of the support substrate, but the embodiment can also be applied to a horizontal stripe type cell stack device in which so-called "horizontal stripe type" cells are stacked, the cells being provided with the element portions provided at a plurality of locations separated from each other on the surface of the support substrate, respectively, and the adjacent element portions being electrically connected to each other.

Further, in the present embodiment, the hollow and flat plate-shaped support substrate is exemplified, but the embodiment can also be applied to a cell stack device using a cylindrical support substrate. Further, as will be described below, the embodiment can also be applied to a flat plate cell stack device in which so-called "flat plate" cells are stacked in the thickness direction.

Further, in the aforementioned embodiment, an example is illustrated in which the fuel electrode is provided on the support substrate, and the air electrode is disposed on the surface of the cell, but the embodiment can also be applied to an opposite arrangement, namely, to a cell stack device in which an air electrode is provided on a support substrate and a fuel electrode is disposed on the surface of a cell.

Further, in the aforementioned embodiment, the "cell", the "cell stack device", the "module", and the "module housing device" are exemplified by the fuel cell, a fuel cell stack device, a fuel cell module, and a fuel cell device, respectively, but they may also be exemplified by an electrolytic cell, an electrolytic cell stack device, an electrolytic module, and an electrolytic device, respectively.

Figure 13A:
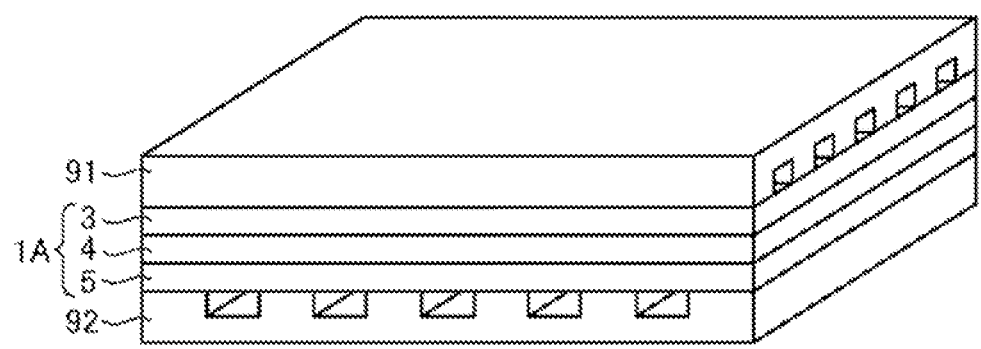
FIG. 13A is a perspective view illustrating a flat plate cell according to a thirteenth modified example of the embodiment.
Figure 13B:
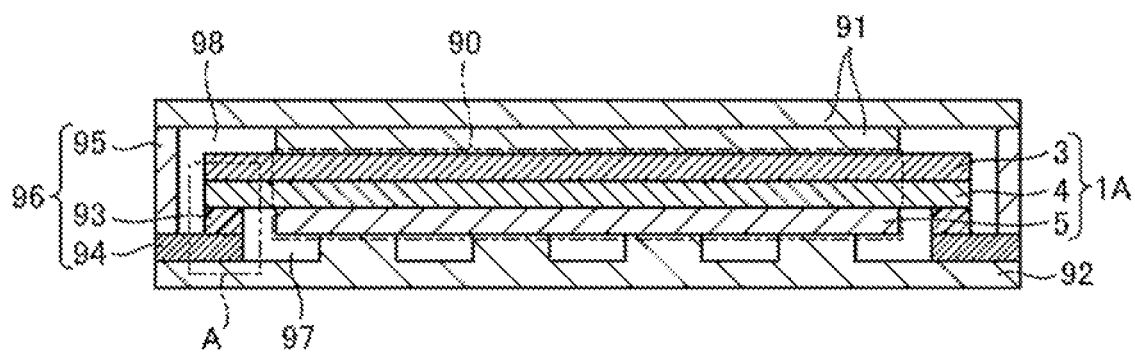
FIG. 13B is a partial cross-sectional view of the flat plate cell illustrated in FIG. 13A.
Figure 13C:
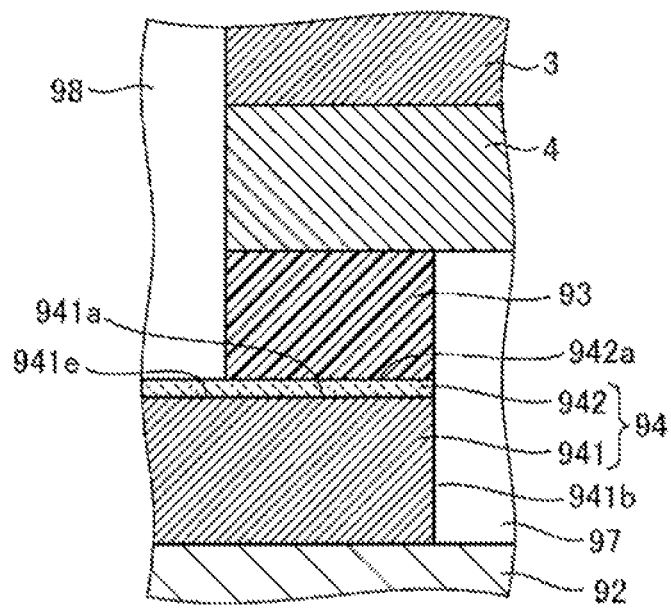
FIG. 13C is an enlarged view of a region A illustrated in FIG. 13B.

FIG. 13A is a perspective view illustrating a flat plate cell according to a thirteenth modified example of the embodiment. FIG. 13B is a partial cross-sectional view of the flat plate cell illustrated in FIG. 13A. FIG. 13C is an enlarged view of a region A illustrated in FIG. 13B.

As illustrated in FIG. 13A, the cell stack device includes a cell 1A in which the fuel electrode 3, the solid electrolyte layer 4, and the air electrode 5 are stacked. Further, as illustrated in FIG. 13B, the cell 1A includes an element portion 90 in which the solid electrolyte layer 4 is sandwiched between the fuel electrode 3 and the air electrode 5. In the cell stack device in which a plurality of the flat plate cells are stacked, for example, the element portions 90 included in each of a plurality of the cells 1A are electrically connected to each other by conductive members 91 and 92, which are metal layers disposed adjacent to each other. The conductive members 91 and 92 cause the element portions 90 of the adjacent cells 1A to be electrically connected to each other, and also include a gas-flow passage for supplying gas to the fuel electrode 3 or the air electrode 5.

As illustrated in FIG. 13B, the flat plate cell stack includes a sealing material that hermetically seals a flow passage 98 of the fuel gas and a flow passage 97 of the oxygen-containing gas. The sealing material is a fixing member 96 of the cell, and includes a bonding material 93, and support members 94 and 95, which constitute a frame. The bonding material 93 may be glass, or may be a metal material such as silver solder.

The support member 94 may be a so-called separator that partitions the flow passage 98 of the fuel gas and the flow passage 97 of the oxygen gas. The material of the support members 94 and 95 may be, for example, a conductive metal, or may be an insulating ceramic. When the bonding material 93 is, for example, insulating glass, both the support members 94 and 95 may be metal, or one of the support members 94 and 95 may be an insulating material. When the bonding material 93 is a conductive metal, both or one of the support members 94 and 95 may be an insulating material. When the support members 94 and 95 are metal, the support members 94 and 95 may be formed integrally with the conductive member 92.

One of the bonding material 93 and the support members 94 and 95 has insulating properties, and causes the two conductive members 91 and 92 sandwiching the flat plate cell to be electrically insulated from each other.

The flat plate cell according to the present modified example includes the support member 94 and the bonding material 93, as illustrated in FIG. 13C. The support member 94 includes a base member 941 and a covering layer 942. The base member 941 includes a first surface 941a and a second surface 941b, and contains chromium. The covering layer 942 covers the first surface 941a of the base member 941. The bonding material 93 is positioned between the solid electrolyte layer 4 of the element portion 90 and the first surface 942a of the covering layer 942.

Then, the second surface 941b of the base member 941 has a surface roughness smaller than that of the first surface 941a, and is exposed to the oxidizing atmosphere (the flow passage 97).

As a result of the surface roughness of the first surface 941a facing the covering layer 942 being greater than the surface roughness of the second surface 941b, it is possible to inhibit the leakage of the fuel gas from occurring as a result of the covering layer 942 peeling from the base member 941 or the covering layer 942 breaking. Thus, according to the embodiment, the durability of the support member 94 can be improved.

Furthermore, as a result of the surface roughness of the second surface 941b being smaller than the surface roughness of the first surface 941a, during the high-temperature operation, it is possible to inhibit the chromium (Cr) contained in the base member 941 from being released into the oxidizing atmosphere (the flow passage 97). Thus, according to the embodiment, the durability of the support member 94 can be improved, and thus, the durability of the cell stack device can be improved.

Figure 13D:
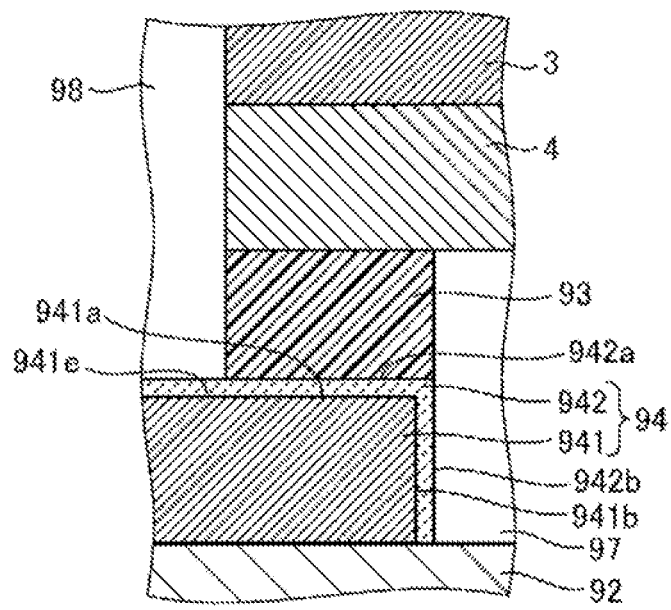
FIG. 13D is an enlarged view of the region A according to a modified example of the flat plate cell.

FIG. 13D is an enlarged view of the region A according to a modified example of the flat plate cell. As illustrated in FIG. 13D, this flat plate cell is different from the flat plate cell illustrated in FIG. 13C in that the covering layer 942 further covers the second surface 941b of the base member 941. Then, a second surface 942b of the covering layer 942 has a surface roughness smaller than that of the first surface 942a facing the bonding material 93, and is exposed to the oxidizing atmosphere (the flow passage 97).

As a result of the surface roughness of a first surface 942a facing the bonding material 93 being greater than the surface roughness of the second surface 942b, the adhesiveness between the bonding material 93 and the covering layer 942 is improved. Thus, it is possible to inhibit the leakage of the fuel gas from occurring as a result of the bonding material 93 and the covering layer 942 from peeling off, or the covering layer 942 breaking. Thus, according to the embodiment, the durability of the support member 94 can be improved.

Furthermore, as a result of the surface roughness of the second surface 942b being smaller than the surface roughness of the first surface 942a, during the high-temperature operation, it is possible to inhibit the chromium (Cr) contained in the base member 941 from being released into the oxidizing atmosphere (the flow passage 97) via the covering layer 942. Thus, according to the embodiment, the durability of the support member 94 can be improved, and thus, the durability of the cell stack device can be improved.

Note that in the examples illustrated in FIGS. 13C and 13D, the covering layer 942 is positioned so as to cover a surface 941e, of the base member 941, facing the reducing atmosphere (the flow passage 98). However, the configuration is not limited thereto, and the surface 941e may be exposed to the reducing atmosphere (the flow passage 98).

While the present disclosure has been described in detail, the present disclosure is not limited to the aforementioned embodiment, and various changes, improvements, and the like can be made without departing from the gist of the present disclosure.

As described above, the composite member (the support body 15) according to the embodiment includes the base member 151 and the covering layer 152. The base member 151 includes the first surface 151a that is not exposed to the oxidizing atmosphere, and contains chromium. The covering layer 152 covers the first surface 151a, and includes the first outer surface (the first surface 152a) that is not exposed to the oxidizing atmosphere. At least one of the base member 151 and the covering layer 152 includes the exposed surface exposed to the oxidizing atmosphere. The surface roughness of the exposed surface is different from the surface roughness of the first surface 151a or the first outer surface (the first surface 152a). As a result, the durability of the composite member (the support body 15) can be improved.

Further, the cell stack device 10 according to the embodiment includes the plurality of cells 1, the composite member (the support body 15) described above, and the bonding material 13. The plurality of cells 1 includes the element portion, and includes the first cell. The bonding material 13 is positioned between the element portion and the first outer surface (the first surface 152a) of the covering layer 152. The base member 151 includes the first surface 151a facing the first cell, and the second surface 151b that includes the exposed surface and does not face the first cell. The second surface 151b has a surface roughness smaller than that of the first surface 151a. As a result, it is possible to suppress the deterioration in battery performance of the cell stack device 10.

Further, the module 100 according to the embodiment includes the cell stack device 10 described above, and the housing container 101 that houses the cell stack device 10. As a result, the module 100 can be obtained that suppresses the deterioration in battery performance.

Further, the module housing device 110 according to the embodiment includes the module 100 described above, the auxiliary device for operating the module 100, and the external case that houses the module 100 and the auxiliary device. As a result, the module housing device 110 can be obtained that suppresses the deterioration in battery performance.

Noted that the embodiment disclosed herein is exemplary in all respects and not restrictive. Indeed, the aforementioned embodiment can be embodied in a variety of forms. Furthermore, the aforementioned embodiment may be omitted, replaced, or changed in various forms without departing from the scope of the appended claims and the purpose thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A member comprising:
a base member comprising a first surface not exposed to an oxidizing atmosphere and a second surface exposed to the oxidizing atmosphere and being in contact with the first surface, the base member containing chromium; and
a surface roughness of the second surface is smaller than a surface roughness of the first surface.

2. A composite member comprising:
the member according to claim 1; and
a covering layer, the covering layer comprising:
a first outer surface covering the first surface and not exposed to the oxidizing atmosphere; and
a second outer surface covering the second surface and exposed to the oxidizing atmosphere.

3. The composite member according to claim 2, wherein the first outer surface has a surface roughness greater than a surface roughness of the second outer surface.

4. The composite member according to claim 2, wherein the second outer surface has a surface roughness smaller than a surface roughness of the first outer surface.

5. The composite member according to claim 2, wherein a surface roughness of the second outer surface is smaller than a surface roughness of the second surface.

6. The composite member according to claim 2, wherein the covering layer comprises a third outer surface positioned between the first outer surface and the second outer surface.

7. The composite member according to claim 2, wherein the third outer surface has a surface roughness smaller than a surface roughness of the first outer surface.

8. The composite member according to claim 6, wherein the third outer surface is exposed to the oxidizing atmosphere, and has a surface roughness greater than a surface roughness of the second outer surface.

9. The member according to claim 1, wherein a third surface that is positioned between the first surface and the second surface.

10. The composite member according to claim 2, wherein the first surface or the first outer surface has a smaller surface roughness in a portion close to the oxidizing atmosphere than in a portion away from the oxidizing atmosphere.

11. The composite member according to claim 2, further comprising:
one or a plurality of particle bodies positioned in an inner region and not positioned in an outer region and in the base member, wherein
the inner region extending from an intermediate portion of the covering layer to the inner surface, the intermediate portion being positioned between an outer surface of the covering layer and an inner surface of the covering layer facing the base member; and
the outer region extending from the outer surface to the intermediate portion.

12. A cell stack device comprising:
an element portion;
the composite member according to claim 2; and
a bonding material positioned between the element portion and the first outer surface.

13. A module comprising:
the cell stack device according to claim 12; and
a housing container configured to house the cell stack device.

14. A module housing device comprising:
the module according to claim 13;
an auxiliary device configured to operate the module; and
an external case configured to house the module and the auxiliary device.

15. A composite member comprising:
a base member;
a covering layer configured to cover the base member; and
one or a plurality of particle bodies positioned in an inner region, and not positioned in an outer region and in the base member, and
wherein the covering layer comprises:
an inner surface facing the base member;
an intermediate portion positioned at a center between an outer surface of the covering layer and the inner surface;
the inner region extending from the intermediate portion to the inner surface; and
the outer region extending from the outer surface to the intermediate portion.

* * * * *